US010308316B2

(12) United States Patent
Braedt

(10) Patent No.: US 10,308,316 B2
(45) Date of Patent: Jun. 4, 2019

(54) REAR WHEEL SPROCKET ARRANGEMENT FOR A BICYCLE

(71) Applicant: SRAM Deutschland GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 337 days.

(21) Appl. No.: 15/178,009

(22) Filed: Jun. 9, 2016

(65) Prior Publication Data

US 2016/0362159 A1 Dec. 15, 2016

(30) Foreign Application Priority Data

Jun. 9, 2015 (DE) .................. 10 2015 210 503

(51) Int. Cl.
| | | |
|---|---|---|
| *F16H 55/30* | (2006.01) | |
| *B62M 9/10* | (2006.01) | |
| *B62M 9/121* | (2010.01) | |
| *B62M 6/55* | (2010.01) | |
| *B62M 9/12* | (2006.01) | |

(52) U.S. Cl.
CPC ............... *B62M 9/10* (2013.01); *B62M 6/55* (2013.01); *B62M 9/121* (2013.01); *F16H 55/30* (2013.01); *B62M 9/12* (2013.01)

(58) Field of Classification Search
CPC .......... B62M 9/10; B62M 6/55; B62M 9/121; B62M 9/12; F16H 55/30
USPC ................................... 74/348, 661
See application file for complete search history.

(56) References Cited

U.S. PATENT DOCUMENTS

| | | | |
|---|---|---|---|
| 3,748,916 A | 7/1973 | Morse | |
| 4,268,259 A | 5/1981 | Segawa et al. | |
| 6,264,575 B1 | 4/1999 | Lim | |
| 5,954,604 A | 9/1999 | Nakamura | |
| 6,340,338 B1 | 1/2002 | Kamada | |
| 8,834,309 B2 | 9/2014 | Braedt | |
| 8,911,314 B2 | 12/2014 | Braedt | |
| 9,272,750 B2 * | 3/2016 | Bohm | B62M 9/126 |
| 2001/0041641 A1 | 11/2001 | Mercat | |
| 2005/0218623 A1 * | 10/2005 | Oishi | B62M 9/1242 280/200 |
| 2006/0128511 A1 | 6/2006 | Oishi | |
| 2009/0042680 A1 | 2/2009 | Valle | |
| 2011/0105263 A1 | 5/2011 | Braedt | |
| 2012/0208662 A1 | 8/2012 | Braedt | |
| 2012/0225745 A1 * | 9/2012 | Oishi | B62M 9/10 474/160 |
| 2012/0309572 A1 * | 12/2012 | Braedt | B62M 9/10 474/160 |

(Continued)

FOREIGN PATENT DOCUMENTS

| | | |
|---|---|---|
| AU | 2011201317 A1 | 10/2012 |
| DE | 3810974 A1 | 12/1988 |

(Continued)

*Primary Examiner* — Ha Dinh Ho

(57) ABSTRACT

A rear wheel sprocket arrangement for a bicycle comprises a plurality of sprockets comprising at least seven (7) coaxially arranged sprockets having different numbers of teeth, wherein an entire gear range of the sprocket arrangement is at least three-hundred fifty percent (350%), and wherein an average percentage gear stage step lies within a range of fifteen percent (15%) to thirty percent (30%).

31 Claims, 3 Drawing Sheets

(56) References Cited

U.S. PATENT DOCUMENTS

| | | | |
|---|---|---|---|
| 2013/0017914 A1* | 1/2013 | Braedt | B62M 9/10 474/160 |
| 2014/0018199 A1* | 1/2014 | Shahana | B62M 9/121 474/82 |
| 2014/0087901 A1* | 3/2014 | Shipman | B62M 9/132 474/82 |
| 2014/0128191 A1* | 5/2014 | Bohm | B62M 9/126 474/82 |
| 2015/0080160 A1 | 3/2015 | Staples | |
| 2015/0243019 A1 | 8/2015 | Hall et al. | |
| 2016/0167737 A1 | 6/2016 | Tokuyama et al. | |

FOREIGN PATENT DOCUMENTS

| | | |
|---|---|---|
| DE | 19629602 A1 | 1/1998 |
| DE | 202012006903 U1 | 8/2012 |
| DE | 102012204452 A1 | 9/2013 |
| DE | 102014018568.0 | 12/2014 |
| EP | 1043221 A2 | 10/2000 |
| EP | 1188658 A2 | 3/2002 |
| EP | 1609716 A2 | 12/2005 |
| EP | 1671880 A2 | 6/2006 |
| EP | 2022712 A2 | 2/2009 |
| EP | 2048075 A2 | 4/2009 |
| GB | 2171474 A | 8/1986 |

* cited by examiner

REAR WHEEL SPROCKET ARRANGEMENT FOR A BICYCLE

This application claims priority to, and/or the benefit of, German patent application DE 10 2015 210 503.2, filed on Jun. 9, 2015.

BACKGROUND OF THE INVENTION

The present invention relates to a rear wheel sprocket arrangement for a bicycle, to a drive assembly for a bicycle with such a rear wheel sprocket arrangement, and to a bicycle with such a rear wheel sprocket arrangement or/and with such a drive assembly.

U.S. Pat. No. 3,748,916 A belonging to Morse is considered to be the closest prior art. This patent discloses a rear wheel sprocket arrangement with an extremely large gear range of 500%, which is produced by a total of five (5) coaxially arranged sprockets, namely having the following numbers of teeth: nine (9), fourteen (14), twenty (20), thirty (30), and forty-five (45). The gear range is also referred to as the "gear ratio range" or, in view of the transmission of torque brought about therewith, as the "torque range" or "torque ratio range". The gear range is the ratio of the number of teeth of the largest sprocket to that of the smallest sprocket.

The individual percentage gear stage steps are very large in this known rear wheel sprocket arrangement, which results in clearly perceptible load jumps for the cyclist using the sprocket arrangement. In the present application, an "individual percentage gear stage step" is understood as meaning the difference in the numbers of teeth of axially directly adjacent sprockets, divided by the number of teeth of the smaller of the adjacent sprockets. The individual percentage gear stage steps of the sprocket arrangement known from U.S. Pat. No. 3,748,916 A—these are in total four (4) gear stage steps in five (5) sprockets—are accordingly 55.6%, 42.9%, 50% and 50% from the smallest sprocket to the largest sprocket. In terms of the arithmetic mean, i.e. the total sum of the individual percentage gear stage steps divided by the number of gear stage steps present, the average percentage gear stage step calculated in this manner is 49.6%, i.e. only slightly less than 50%.

Furthermore, the prior art discloses rear wheel sprocket arrangements which have a larger number of sprockets and, associated therewith, a smaller average percentage gear stage step, in particular because said known rear wheel sprocket arrangements have a considerably smaller gear range despite their larger number of sprockets.

EP 2 048 075 A discloses a rear wheel sprocket arrangement having a total of nine (9) sprockets, the sprockets of which have the following numbers of teeth: eleven (11), thirteen (13), fifteen (15), seventeen (17), twenty (20), twenty-three (23), twenty-six (26), thirty (30), and thirty-four (34). This sprocket arrangement therefore has a gear range of approximately 309% with an average percentage gear stage step of 15.2%.

As a further example of the prior art, reference should be made to a twelve (12) sprocket arrangement which is known from EP 2 022 712 A. This can have, for example, sprockets having the following numbers of teeth: eleven (11), twelve (12), thirteen (13), fourteen (14), fifteen (15), seventeen (17), eighteen (18), nineteen (19), twenty-one (21), twenty-three (23), twenty-five (25), and twenty-seven (27). This sprocket arrangement has a gear range of approximately 245.5% with an average percentage gear stage step of only 8.5%.

These known rear wheel sprocket arrangements no longer always meet modern demands imposed thereon. New demands imposed on sprocket arrangements arise, firstly, from the tendency to reduce the number of front chainrings on the bicycle, optionally even to use just one (1) single chainring, and from the tendency to equip bicycles with electric auxiliary motors. The last-mentioned bicycles are currently generally referred to as pedelecs.

In particular the technical and legal frameworks for the operation of pedelecs, the drives of which are assisted by electric motors, result in demands being imposed on rear wheel sprocket arrangements relating to a large gear range and a comparatively moderate spacing between the individual sprockets in order not to overload the cyclist by torque jumps possibly occurring when changing gear. Furthermore, it should be noted that electric auxiliary motors, also referred to here as "assisting electric motors", may each generally output its assisting torque only until a predetermined bicycle speed or a predetermined bicycle speed range is reached. At higher speeds, the cyclist is reliant solely on his muscle power.

In the case of what are referred to as pedelecs, there are substantially higher continuous and peak loads acting on the rear wheel sprocket arrangement than in the case of bicycles operated solely by muscle power. The gear changing behavior on the bicycle also changes because of the higher power which is available owing to the assisting motor torque. In the case of conventional bicycles driven solely by muscle power, generally the change from one sprocket of the sprocket arrangement to an axially adjacent sprocket is not made under load or only under a small load. However, in the case of bicycles assisted by an electric motor the change is frequently made, in particular from a sprocket to the next smaller sprocket, under full motor load, i.e. during an acceleration operation. It should be noted here that, in the case of modern pedelecs, the assisting torque output by the electric motor is transmitted, like the muscle power of the cyclist, to the rear wheel of the bicycle via the rear wheel sprocket arrangement. Owing to the high overall torque available in the case of pedelecs from the combination of the torque based on muscle power and the assisting torque of the electric motor, specifically in the low speed range—depending on regulations, assisting the muscle power of the cyclist by an electric motor is usually permitted up to a travel speed of between twenty (20) and thirty (30) kilometers per hour—such high acceleration values can be obtained that undesirable, what are referred to as "multiple gear changing operations" occur, in which a temporally following gear changing operation is initiated before the temporally preceding gear changing operation at the rear wheel sprocket arrangement is finished.

Further changed demands emerge when the number of front chainrings is reduced since the torque transmission range of the bicycle then has to be increasingly provided by the rear wheel sprocket arrangement. This goes so far that, in the case of a single front chainring, the entire torque transmission range which is available depends solely on the configuration of the rear wheel sprocket arrangement.

The reduction in the number of chainrings also may lead to cross-chaining situations of the bicycle chain running between the chainring or the chainrings and the rear wheel sprocket arrangement during operation.

SUMMARY

It is the object of the present invention to develop known rear wheel sprocket arrangements for a bicycle in such a manner that they can better comply with the demands mentioned above than prior art rear wheel sprocket arrangements can.

This object is achieved according to the present invention by a rear wheel sprocket arrangement for a bicycle, comprising a plurality of sprockets comprising at least seven (7) coaxially arranged sprockets having different numbers of teeth, wherein an entire gear range of the sprocket arrangement is at least 350%, and wherein an average percentage gear stage step lies within a range of 15% to 30%.

An individual percentage gear stage step is defined as the difference in the numbers of teeth of two (2) axially directly adjacent sprockets divided by the number of teeth of the smaller of the adjacent sprockets. The average percentage gear stage step of the rear wheel sprocket arrangement is defined as the total sum of the individual percentage gear stage steps divided by the number of gear stage steps. A sprocket arrangement with k sprockets having different numbers of teeth in each case has k−1 gear stage steps.

The entire gear range of the sprocket arrangement is defined as the ratio of the number of teeth of the largest sprocket to the number of teeth of the smallest sprocket. Alternatively, the entire gear range of the sprocket arrangement may be at least 400% or at least 435%. Alternatively, the average percentage gear stage step may lay within a range of 20% to 30%.

By means of the stated minimum gear range of at least 350%, the rear wheel sprocket arrangement of the present invention can transmit a torque, which is introduced at the pedal crank of a bicycle and is transmitted by the bicycle chain running between chainring and sprocket arrangement to the rear wheel sprocket arrangement, within a wide range. Therefore, both when the number of front chainrings is reduced and when an assisting torque is optionally introduced by an electric motor in addition to the muscle power supplied by the cyclist, a torque appropriate to the respective cycling situation can be transmitted to the rear wheel of a bicycle via the rear wheel sprocket arrangement. A torque introduced at the pedal crank, and therefore at the front chainring, can thus be stepped down to the rear wheel sprocket arrangement "to fast mode" or "to weak mode" or—for example when travelling uphill—can be stepped up "to slow mode" or "to strong mode".

With an average percentage gear stage step falling within a range of 15% to 30%, preferably even of 17%, 18% or 20% to 30%, although the average gear stage step is larger than in the case of known sprocket arrangements with a large number of sprockets, it is significantly smaller than in the case of known sprocket arrangements with a large gear range. Therefore, during the operation of the sprocket arrangement, when a change is made from one sprocket to an axially adjacent sprocket, undesirably large torque jumps are avoided. At the same time, with a number of sprockets of already at least seven (7) coaxially arranged sprockets, the outlay on installation and the construction space required by the sprocket arrangement can advantageously be kept within limits.

When the proposed rear wheel sprocket arrangement is used on pedelecs, the problem of the "multiple gear changing operations" is also avoided. By means of the proposed spacing of the rear wheel sprocket arrangement with reference to the stated range of values for the average percentage gear stage step, not only is an excessive torque jump which would be perceptible during gear changing avoided, but also the distance between transmission ratios of axially directly adjacent sprockets is increased to such an extent that, when commercially available assisting electric motors are used, even if a high torque is introduced into the pedal crank shaft, there is a sufficiently large temporal interval between two (2) successive gear changing operations that the temporally preceding one of the two (2) gear changing operations can be completed before the gear changing operation temporally following the first one is initiated.

In order to avoid excessively large differences in the individual gear stage steps, it is advantageous if the values of the individual percentage gear stage steps lie within a range of 15% to 35%, i.e. no individual percentage gear stage step is smaller than 15% and none is greater than 35%. Therefore, a certain variability of the individual percentage gear stage steps is possible within the predetermined limits, and therefore, depending on the respectively selected gear stage, a step of different size to the next smaller or to the next larger gear stage can be provided. By this means, different torque demands in different riding situations can be taken into consideration. Overall, however, as uniform a change as possible of the transmission ratio via the gear stages of the rear wheel sprocket arrangement is perceived by the cyclist riding a bicycle having the rear wheel sprocket arrangement according to the invention.

Furthermore, in order to be able to take account of the above-mentioned different torque demands of different riding situations, it may be conceived of to adjust the individual percentage gear stage steps between axially directly adjacent sprockets in a targeted manner. It may thus be conceived for the rear wheel sprocket arrangement to comprise a group of successive axially adjacent sprockets which become progressively larger and between which the values of axially successive individual percentage gear stage steps—when viewing in an axial direction from the smallest sprocket towards the largest sprocket—increase from one gear stage to the next larger one. During gear changing through this group in the direction of the largest sprocket, it is therefore possible for a large torque transmission range to be passed through, with the percentage changes in the transmission ratio becoming ever larger as the sprockets become larger. For example, when gear changing downward (i.e. a gear changing operation to a sprocket with a greater number of teeth), a gear change can be increasingly rapidly made "to slow mode" or "to strong mode". Such a gear stage range can be superbly used as an acceleration range for the motor-assisted acceleration of a bicycle.

Similarly, the rear wheel sprocket arrangement can comprise a group of axially successive sprockets which become degressively larger and between which the values of axially successive individual percentage gear stage steps—when viewed in an axial direction from the smallest sprocket towards the largest sprocket—decrease from one gear stage to the next. In this case, the percentage changes in the transmission ratio when gear changing through said group in the direction of sprockets becoming larger therefore become ever smaller. A group with sprockets becoming degressively larger can be used particularly for those gear stage ranges for which a portion of muscle driving power—increased in comparison to other gear stage ranges—is anticipated.

It should be clarified at this juncture that a sprocket can belong to both groups mentioned. This is the case, for example, for boundary sprockets, and therefore a largest sprocket of the one group may be the smallest sprocket of the other group in each case.

The rear wheel sprocket arrangement preferably has two (2) groups of axially successive sprockets which become degressively larger, wherein, furthermore preferably, the above mentioned group of axially successive sprockets which become progressively larger is placed axially between two (2) groups of axially successive sprockets which become degressively larger. As before, the reference direction here is the axial direction from the smallest sprocket towards the largest sprocket.

A gear stage range which becomes degressively larger can therefore be placed in the region of the smallest sprockets, for example the smallest two (2) or three (3) sprockets, since, when riding in these "rapid" gears, only a reduced, if any, assisting of the cyclist by the electric motor generally takes place because of the previously explained limiting of the motor assisting to speeds below a predetermined limit speed. In these gear stages, the cyclist is predominantly dependent on his muscle power. For ergonomic reasons, it is advantageous, wherever the driver is dependent predominantly on muscle power in order to achieve propulsion, if the gear stage steps are selected to be smaller than wherever the full assisting by the electric motor is available.

Surprisingly, it may also be expedient to configure the entirely "slow" gears, i.e. the gears having the largest sprockets, for example the two (2) or three (3) largest sprockets of the sprocket arrangement, as a gear stage range which becomes degressively larger. These gear stages undoubtedly do indeed provide a transmission ratio at which, under otherwise customary operating conditions, a speed of the bicycle should be anticipated that lies below the limit value and for which complete assisting of the cyclist by electric motor is permissible. However, these gear stages are generally "hill gears" which are selected when travelling on ascents ("travel uphill") and in which a high driving torque and therefore a high driving power are also requested over a prolonged period.

As a rule, for the assisting of the cyclist by electric motor, there is a limit to the continuous power which is output by the assisting electric motor. Said continuous power may indeed be exceeded for a short time in order rapidly to cope with a short, but high load demand. However, if the journey on an ascent lasts for a longer period—for example for a period of more than thirty (30) or sixty (60) seconds—the assisting electric motor can only output the legally permitted continuous power, and therefore an increased portion of muscle driving power should be anticipated even for this load situation.

The gear stage range which becomes progressively larger can therefore advantageously be placed between the two (2) above-described gear stage ranges which become degressively larger.

In order to be able to achieve especially high acceleration values in the low speed range, which is advantageous in particular for the above mentioned pedelecs since, in these, the assisting electric motor may output its torque only up to a predetermined limit speed of the bicycle, it is advantageous if the largest individual percentage gear stage step occurs between sprockets which are assigned to the speed range in which a torque assistance by the electric motor is permitted. This is because the large individual percentage gear stage step then does not need to be overcome solely by muscle power—although this is readily possible when the above mentioned conditions are maintained. Since rear wheel sprocket arrangements are always used on a bicycle together with at least one (1) front chainring, a bicycle speed or at least a bicycle speed range can readily be assigned to each sprocket of the sprocket arrangement, taking into consideration the possible chainrings and rear wheels and also assuming a power which can customarily be output by a cyclist, optionally with assisting by the electric motor. It is therefore particularly advantageous for the above mentioned reasons that the largest individual percentage gear stage step occurs between the third largest sprocket and the fourth largest sprocket or/and between the fourth largest sprocket and the fifth largest sprocket. It may also be conceived here—and this is even preferred in the present case—that the two (2) individual percentage gear stage steps between the third largest sprocket and the fourth largest sprocket and between the fourth largest sprocket and the fifth largest sprocket are identical in size. The latter is preferred in particular for a sprocket arrangement having precisely eight (8) sprockets.

In order to ensure the desired large gear range while avoiding a simultaneously high loading of the bicycle chain, the largest sprocket can have more than forty (40) teeth, for example at least forty-four (44) teeth, preferably at least forty-eight (48) teeth. As will also be shown further below, forty-eight (48) teeth are preferred for the largest sprocket as compared to forty-four (44) teeth since the number forty-eight (48) has more integral factors than the number forty-four (44). This is advantageous for the precise sequence of gear changing operations towards this sprocket. Similarly, the smallest sprocket can have at least ten (10), preferably at least eleven (11) teeth. In order not to unnecessarily restrict the gear range which can be achieved with the sprocket arrangement, the smallest sprocket should not have more than thirteen (13) teeth.

In order to ensure precise gear changing operations between individual sprockets, it is advantageous if the number of teeth of each of the four (4) largest sprockets of the rear wheel sprocket arrangement is an integral multiple of four (4). In order to achieve the values of the above mentioned individual percentage gear stage steps specifically in the case of the largest sprockets, it is preferred, however, if the number of teeth is an integral multiple of eight (8). In this case, it is possible to reach the situation, which is advantageous for achieving extremely precise gear changing operations, in which the numbers of teeth of axially directly adjacent sprockets—here of the four (4) largest sprockets—can be divided by the difference in the numbers of teeth of the axially directly adjacent sprockets.

However, for the smaller sprockets, other conditions generally have to apply than for the previously mentioned four (4) largest sprockets. If the above mentioned steps of eight (8) were continued here, the individual percentage gear stage steps towards the smallest sprocket would become undesirably large. This can be avoided by the number of teeth of each of three (3) sprockets from a group of four (4) axially successive sprockets, wherein this group comprises the sprockets from the fourth largest to the seventh largest sprocket, being an integral multiple of three (3), even better an integral multiple of six (6). It should be clarified that the fourth largest sprocket preferably meets all of the above mentioned conditions, for example if it comprises twenty-four (24) teeth, and therefore its number of teeth can be divided by eight (8), six (6), four (4), and three (3).

For the above mentioned reasons of as precise a gear changing behavior as possible, according to an advantageous development of the invention the rear wheel sprocket arrangement has at least five (5) sprockets, preferably at least six (6) sprockets, for which the following divisibility condition applies that the numbers of teeth of two (2) axially directly adjacent sprockets can each be divided by the difference in said numbers of teeth without a remainder. This preferably involves the five (5), preferably six (6), largest sprockets of the sprocket arrangement. Whenever the sprocket arrangement has a total of precisely seven (7) sprockets, it can have precisely five (5) sprockets for which the divisibility condition mentioned is met. In the case of a sprocket arrangement having a total of precisely eight (8) sprockets, said sprocket arrangement can have precisely six (6) sprockets for which the divisibility condition mentioned is met.

The use of a rear wheel sprocket arrangement having at least seven (7) sprockets has the advantage that the largest sprocket does not necessarily have to be cupped or otherwise formed such as with a bent cross section. There is sufficient construction space in order to provide the largest sprocket as a generally planar sprocket. By this means, even the particularly loaded largest sprocket can withstand the chain loads that are higher during assistance by the electric motor because of the higher available torque without thereby having to accept weight disadvantages, for example because of additional stiffening means and the like.

The largest sprocket is preferably not itself directly designed for transmitting torque to the bicycle rear wheel axle. This preferably takes place by means of a driver which is coupled in a manner known per se to the bicycle rear wheel axle. The largest sprocket is preferably also not itself designed directly for transmitting torque to the driver. Instead, it is provided that the largest sprocket has a central opening through which the driver passes, wherein there is no direct form-fitting engagement between the largest sprocket itself and the driver for transmitting torque between the largest sprocket and the driver.

Torque can be transmitted between the largest sprocket and a driver by an adapter element which is arranged in the torque transmission path between the largest sprocket and the driver. The largest sprocket can therefore be coupled to a driver by an adapter element for the transmission of torque, wherein the adapter element is preferably placed on that side of the largest sprocket which faces away from the rest of the sprockets. The one (1) driver mentioned here could be the driver mentioned in the previous paragraph. Although it is conceivable for the adapter element to be placed only partially on that side of the largest sprocket which faces away from the smaller sprockets, it is preferred for the adapter element to be placed entirely on this side. By this means, it is possible to arrange the entire rear wheel sprocket arrangement on a bicycle at a larger axial distance from the longitudinal center plane of the bicycle than if the adapter element were arranged axially within the sprocket arrangement. By this means, the chain skew can be reduced especially in the case of engagement of the chain with the large sprockets. The large sprockets, because of their large diameter, are most highly loaded by chain skew and, because of their size, have a greater buckling tendency than the smaller sprockets of the sprocket arrangement.

In order to facilitate manufacturing and installation and in order to obtain as great a stability and rigidity of the sprocket arrangement as possible, it can be provided that a plurality of sprockets is formed as a single-piece sprocket component within the rear wheel sprocket arrangement. The entire rear wheel sprocket arrangement can in principle be designed as a single-piece sprocket component although this is not preferred. The largest sprocket is preferably designed as a separate individual sprocket, for example in order to be able to select a suitable material for this sprocket, in which the greatest torque is transmitted to the bicycle rear wheel, irrespective of the material of other sprockets of the sprocket arrangement. The largest sprocket can also, as an individual sprocket for the transmission of torque, be directly connected to the second largest sprocket which is axially adjacent thereto. This is generally indeed the case for as effective a transmission of torque as possible.

The smallest sprocket of the sprocket arrangement can also be formed separately as an individual sprocket in order to make said sprocket easily exchangeable. By this means, highly loaded, worn or deformed sprockets can easily be replaced, or torque transmission ratios can be adapted to changed demands by exchanging sprockets.

The aspect of the design as an individual sprocket for easier exchangeability preferably applies to that sprocket with which, assuming customary pedal frequencies within a range of sixty-five (65) to seventy-five (75) revolutions per minute and taking into consideration the known chainring and the known rear wheel of a bicycle, a riding speed is achieved which corresponds to the above-described assisting limit speed, above which assisting of the cyclist by the electric motor is impermissible. Observations have shown that cyclists of pedelecs like to exhaust the scope of the assistance by the electric motor that is technically available to them, but do not generally attempt to go therebeyond by using their own muscle power. In this respect, in the case of pedelecs, an over-averagely high stressing of said sprocket assigned to the assisting speed limit should be anticipated. Particularly this sprocket is therefore preferably configured as an exchangeable individual sprocket. This is in many cases the sixth largest sprocket of the sprocket arrangement. Depending on the total number of sprockets of the sprocket arrangement, this sprocket can also be the fifth largest sprocket or the seventh largest sprocket.

Preferably at least three (3), particularly preferably at least four (4), most preferably precisely four (4) sprockets of the rear wheel sprocket arrangement are therefore designed as a single-piece sprocket component within the rear wheel sprocket arrangement. The single-piece sprocket component preferably contains the second largest sprocket. By contrast, the second smallest sprocket, possibly also the third smallest sprocket, is preferably provided as an individual sprocket which is formed separately in order to facilitate the exchange thereof.

Alternatively or additionally to the single-piece design of a plurality of sprockets, a plurality of sprockets, in particular in each case two (2) axially directly adjacent sprockets, can also be directly connected to each other by connecting means, such as, for example, pins, rivets, screws, or any combination thereof. In order to achieve as high a rigidity as possible, the connecting means are provided radially in the region of the outermost 50% of the radial extent of the smaller of two (2) sprockets, which are directly connected to each other, between said sprockets, preferably in the region of the outermost 33%, particularly preferably in the region of the outermost 25%, most preferably in the region of the outermost 20% of the radial extent of the smaller of the two (2) sprockets which are connected directly to each other. The connecting means can be formed integrally with one (1) of the two (2) directly connected sprockets, preferably with the smaller sprocket. The connecting means are designed for transmitting torque about the common sprocket axis, preferably also for transmitting axial force along the sprocket axis. In order to achieve as stable a connection as possible radially as far as possible on the outside, the connecting means can be connected to the smaller of two (2) sprockets, which are directly axially adjacent and are connected to each other, in the region of the roots of the teeth thereof.

The preferred radial regions, which are mentioned for the connecting means, for the attachment of the latter to or between a pair of axially directly adjacent sprockets also apply to the design of a direct single-piece connection of two (2) axially directly adjacent sprockets to each other.

While it was stated at the beginning that the rear wheel sprocket arrangement comprises at least seven (7) sprockets, the rear wheel sprocket arrangement may, of course, also comprise significantly more than seven (7) sprockets. However, this is not at all necessary in order to realize the desired large gear range with the above mentioned average percentage spacing. The rear wheel sprocket arrangement advantageously comprises precisely seven (7) or precisely eight (8) or precisely nine (9) sprockets. Such a number of sprockets permits the above mentioned design of the largest sprocket as a generally planar sprocket having the above mentioned advantages. The precise number of sprockets mentioned also permits the above mentioned advantageous arrangement of the adapter element axially outside the sprocket arrangement, i.e. on that side of the largest sprocket which faces away from the smaller sprocket, with the above-described result of advantageously reduced chain skew at the larger sprockets.

In principle, any chains can be used with the rear wheel sprocket arrangement. However, in order to achieve a small axial construction space demand of the sprocket arrangement, it is advantageous if a front face distance between axially directly adjacent sprockets is between 4.2 millimeters and 4.4 millimeters, preferably between 4.3 millimeters and 4.4 millimeters, particularly preferably 4.35 millimeters. The "front face distance" here is the distance between front faces of axially directly adjacent sprockets, which front faces are orthogonal with respect to the common axis of rotation of the sprockets, in a region of the sprocket body in the vicinity of a tooth on that side of the sprocket which faces towards the smaller sprocket in each case or away from the larger sprocket in each case. One skilled in the art understands the term "front face" since the position of the rear ratchet mechanism of a derailleur is aligned with said face. The "front face" is generally the face on the sprocket side which, in the mounted state, faces away from the longitudinal center plane of the bicycle, and on which face a sprocket, disregarding any axially protruding teeth which are present and any projections which are present in the vicinity of the hub, rests on a flat underlying surface.

The bicycle chain interacting with the rear wheel sprocket arrangement should be selected in accordance with the selected front face distance.

In the case of a seven (7) sprocket arrangement, the rear wheel sprocket arrangement according to the invention preferably has the following spacing from the smallest sprocket towards the largest sprocket: twelve (12), fourteen (14), eighteen (18), twenty-four (24), thirty-two (32), forty (40), and forty-eight (48). By contrast, in the case of an eight (8) sprocket arrangement, the preferred spacing is as follows: eleven (11), thirteen (13), fifteen (15), eighteen (18), twenty-four (24), thirty-two (32), forty (40), and forty-eight (48).

According to a further aspect of the present invention, the present application relates to a rear wheel sprocket arrangement for a bicycle, comprising at least seven (7) coaxially arranged sprockets having different numbers of teeth, wherein the entire gear range of the sprocket arrangement—defined as the ratio of the number of teeth of the largest sprocket to the number of teeth of the smallest sprocket—is at least 350%, preferably at least 400%, particularly preferably at least 435%.

The present invention furthermore relates to a drive assembly for a bicycle having a rear wheel sprocket arrangement, as described above, and having a front chainring, wherein the number of teeth of the front chainring is smaller than the number of teeth of the largest sprocket and larger than the number of teeth of the third largest sprocket. A "hill gear" making it possible to overcome even large ascents can therefore be realized between the front chainring and the largest sprocket, while even as the chain is being placed onto the third largest sprocket, the torque is stepped down "to fast mode" or "to weak mode". The chainring and the second largest sprocket can have the same number of teeth here, and therefore, when the chain is placed onto the second largest sprocket, the torque introduced at the chainring is transmitted unchanged, apart from unavoidable friction losses, to the rear wheel.

Since the present rear wheel sprocket arrangement is specifically also intended to meet demands which are imposed on a drive assembly for a bicycle having precisely one (1) front chainring, the drive assembly preferably comprises precisely one (1) front chainring. In the event that more than one (1) front chainring is present, the conditions specified in the preceding claim are intended to apply to the largest chainring.

The decisive factor here is intended to be the "effective number of teeth" of the chainring, i.e. a number of teeth which arises taking into consideration a gearing possibly arranged between the location at which torque is introduced and the chainring and the transmission ratio of said gearing. If, for example, between the location at which torque is introduced and a chainring having only sixteen (16) teeth a gearing is provided which increases the introduced torque towards the chainring by the factor of 2.5, i.e. steps up said torque "to strong mode"—wherein, for reasons of maintaining energy, the rotational speed at which the torque is introduced is reduced by the same factor—the chainring has an effective number of teeth which is increased by 2.5 times; i.e. forty (40) teeth in this example.

Since the present rear wheel sprocket arrangement is particularly suitable for the interaction with an electric motor assisting the cyclist, the drive assembly furthermore preferably comprises an assisting electric motor which is designed or/and is arranged in order to transmit its assisting torque to the rear wheel via the rear wheel sprocket arrangement. The assisting electric motor can be coupled or couplable here to the chainring in order to transmit torque. For example, the electric motor can be coupled or couplable to the pedal crank shaft to which the pedal cranks actuated by the cyclist are also coupled. The coupling of the electric motor to the chainring or to the pedal crank shaft can take place by means of a gearing, for example a planetary gearing.

The present invention finally relates to a bicycle having a rear wheel sprocket arrangement, as is described above, or/and having a drive assembly, as has previously been described.

BRIEF DESCRIPTION OF DRAWINGS

The present invention is explained in more detail below with reference to the attached drawings, in which.

DETAILED DESCRIPTION

Figure 1:
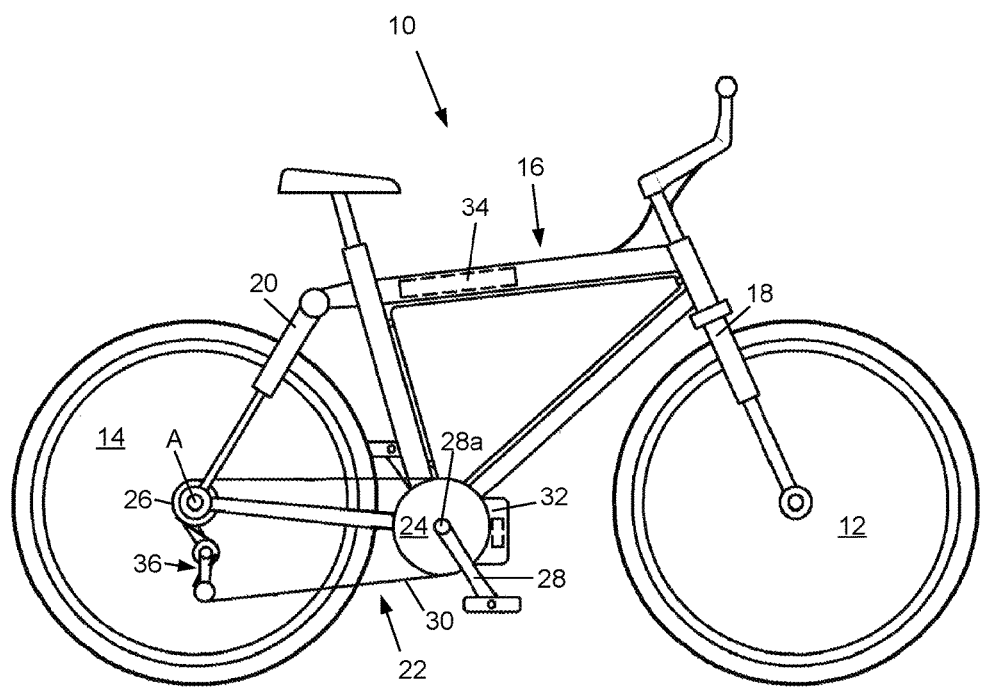
FIG. 1 is a roughly schematic side view of a bicycle which is equipped with a drive assembly according to the invention using a rear wheel sprocket arrangement according to the invention (the rear wheel sprocket arrangement is merely indicated in a roughly schematic manner)

In FIG. 1, a bicycle provided with a sprocket arrangement according to the invention is denoted in general by 10. A front wheel 12 and a rear wheel 14 are fastened to a bicycle frame 16 so as to be rotatable about respective wheel axles which are orthogonal to the plane of the drawing of FIG. 1. The front wheel 12 can be connected to the bicycle frame 16 via a sprung fork 18. The rear wheel 14 can also be connected to the bicycle frame 16 via a sprung suspension 20.

The rear wheel 14 is driveable via a drive assembly 22, comprising an individual front chainring 24 and a rear wheel sprocket arrangement 26, which is merely illustrated in roughly schematic form in FIG. 1. The driving torque can be transmitted via pedal cranks 28 and a pedal crankshaft 28a, which is connected thereto, to the front chainring 24 and from the latter by means of a bicycle chain 30 to the rear wheel 14 via the rear wheel sprocket arrangement 26. In order to assist a cyclist driving the pedal cranks 28 with muscle power, an assisting electric motor 32 can be arranged on the bicycle frame 16 in such a manner that the latter also transmits its assisting driving torque to the front chainring 24 via the pedal crankshaft 28a. A gearing, in particular planetary gearing, can be provided between the pedal crankshaft 28a and the chainring 24. The transmission ratio of the gearing should be taken into consideration in the calculation of the effective number of teeth of the chainring 24. The actual number of teeth of the chainring 24 should be multiplied here by the factor with which the gearing transmits a torque, which is introduced into said gearing, towards its output side. An increase in the torque by means of the gearing therefore leads to an effective number of teeth of the chainring 24 which is increased in relation to the actual number of teeth, and vice versa.

A battery 34 as an energy accumulator for the assisting electric motor 32 can be provided in or on the frame 16.

Figure 2:
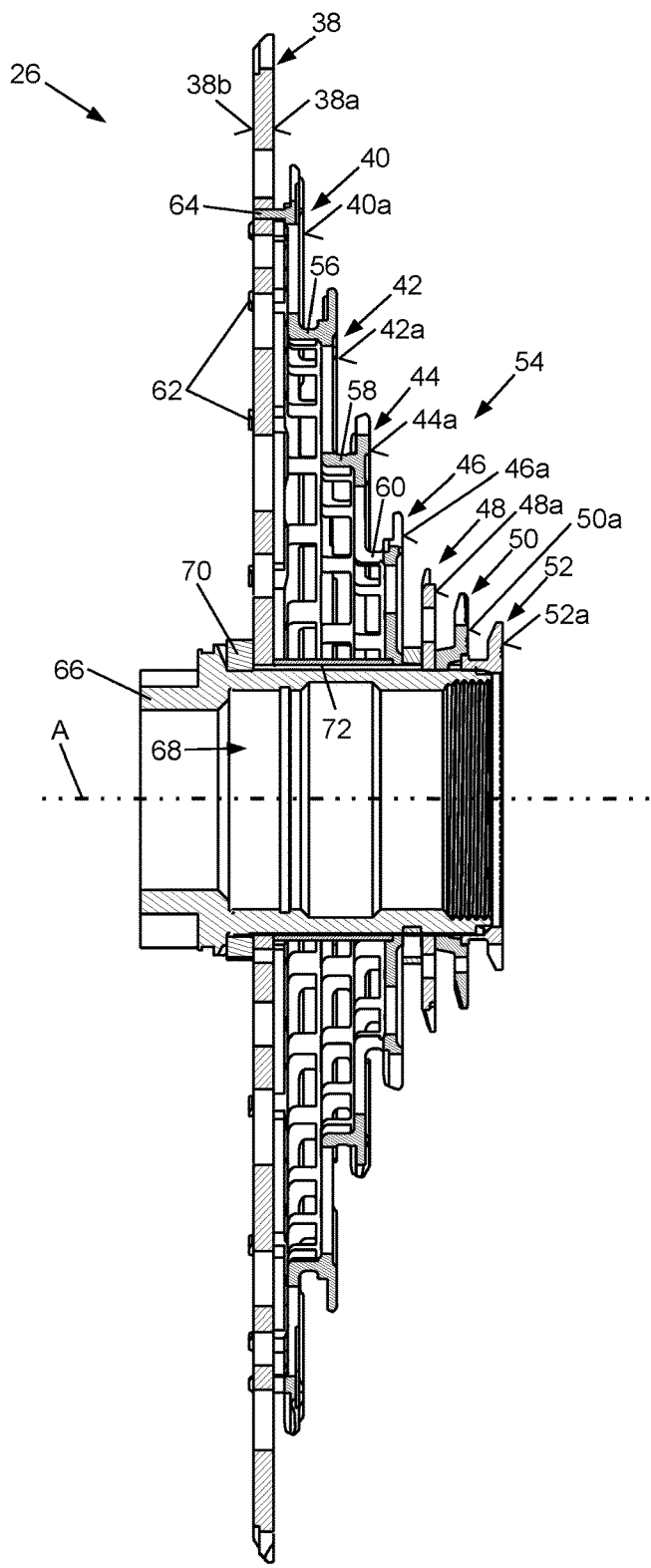
FIG. 2 shows a detailed longitudinal sectional view, which contains the common sprocket axis, of an embodiment according to the invention of a rear wheel sprocket arrangement having eight (8) sprockets.
Figure 3:
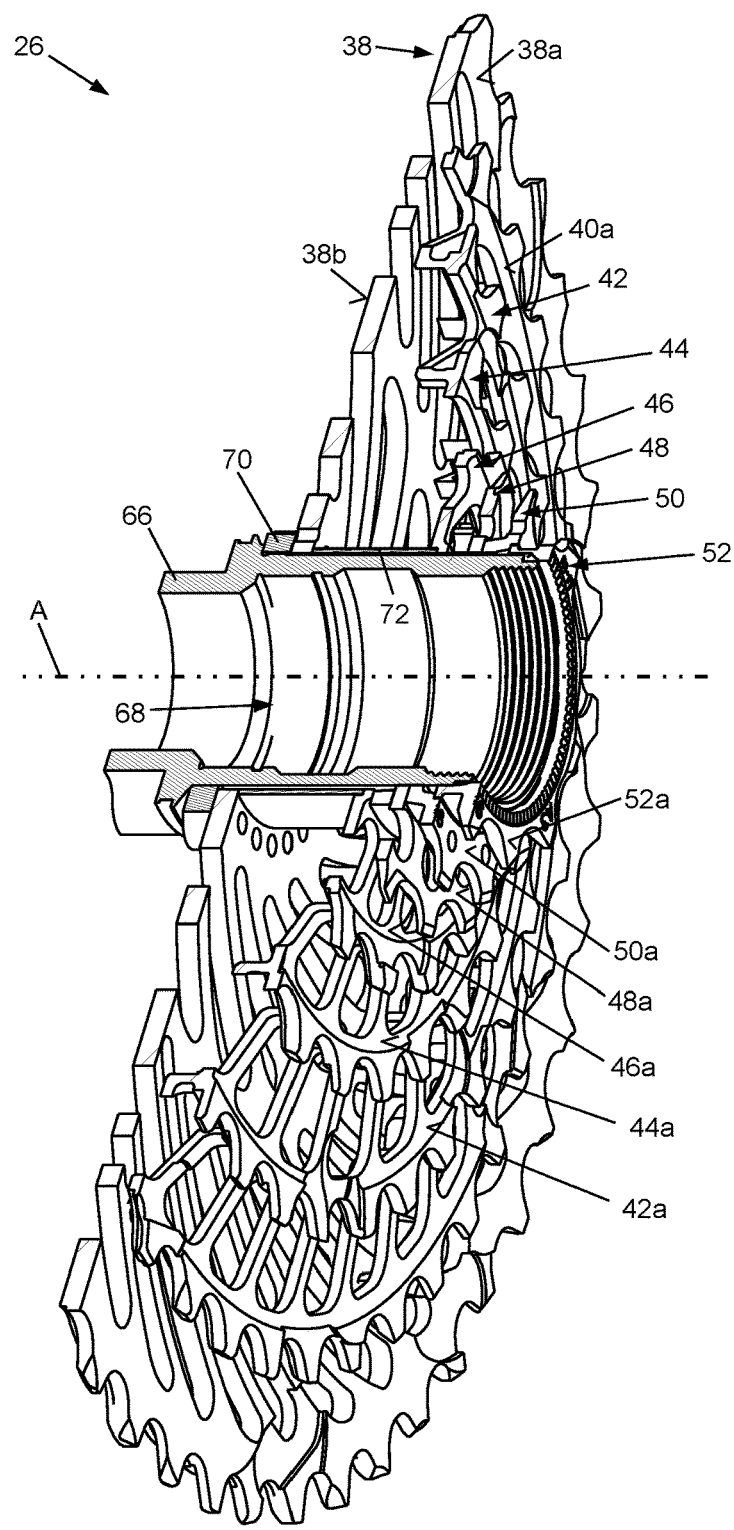
FIG. 3 shows a perspective longitudinal sectional view of the sprocket arrangement of FIG. 1.

As FIGS. 2 and 3 show, the rear wheel sprocket arrangement 26 or else only the sprocket arrangement 26 has a plurality of sprockets which includes a series of coaxial sprockets of different numbers of teeth, wherein, in the mounted state of FIG. 1, the numbers of teeth decrease continuously towards the outside from the longitudinal center plane of the bicycle 10 that is parallel to the plane of the drawing of FIG. 1.

The bicycle chain 30 can be brought in a manner known per se by a rear derailleur 36 into meshing engagement with a sprocket which is to be selected by the cyclist from the plurality of sprockets of the sprocket arrangement 26 in order to transmit torque to the rear wheel 14. The bicycle chain 30 is a roller chain which is known per se and as is typical for use on bicycles.

Both the muscle torque of the cyclist and the assisting torque of the electric motor 32 are transmitted to the rear wheel 14 via the rear wheel sprocket arrangement 26 on the bicycle 10 in the example. The electric motor 32 therefore has the effect as though the cyclist could trigger a pedal power which is increased by the assisting power of the electric motor 32.

Since the bicycle 10 shown by way of example has precisely one (1) front chainring 24, the entire gear range of the bicycle 10 is realized by the rear wheel sprocket arrangement 26. A longitudinal sectional view through said sprocket arrangement 26 is shown in FIG. 2. FIG. 3 shows a perspective longitudinal sectional view through the sprocket arrangement 26 of FIG. 2.

The sprocket arrangement 26 shown by way of example has eight (8) sprockets 38, 40, 42, 44, 46, 48, 50 and 52 which are arranged coaxially with respect to a common sprocket axis A. The sprocket axis A is also the axis of rotation of the rear wheel 14. The sprocket axis A is orthogonal with respect to the plane of the drawing of FIG. 1 and lies in the plane of the drawing of FIG. 2.

Of the sprockets 38 to 52 mentioned, the sprocket 38 is the largest sprocket and the sprocket 52 is the smallest sprocket.

In the present example, the largest sprocket 38, which is preferably of a generally planar design, has forty-eight (48) teeth. The numbers of teeth of the sprockets 40 to 52 are forty (40), thirty-two (32), twenty-four (24), eighteen (18), fifteen (15), thirteen (13), and eleven (11) in the sequence mentioned. The largest sprocket 38 is designed as an individual sprocket, as are the sprockets 48, 50 and 52. By contrast, the sprockets 40, 42, 44 and 46 are preferably designed as a single-piece sprocket component or dome 54. The sprockets 48, 50 and 52 can therefore be exchanged individually as required.

The sprockets 40 to 46 of the sprocket dome 54 are preferably connected by webs 56, 58, 60 which are formed integrally with the respective sprockets, which webs are in each case arranged between two (2) axially directly adjacent sprockets. The webs 56 to 60 are provided here as far radially in the outside as possible in order to obtain a sprocket dome 54 which is as stable and stiff as possible. Depending in each case on the sprocket size, the webs lie in the radially outermost 15% to 25% of the radial region of extent of the smaller of the two (2) axially adjacent sprockets connected directly to each other, measured in each case from the sprocket axis A. The webs preferably end at the smaller of the two (2) directly connected sprockets in the region of a root of a tooth.

Webs 62 are advantageously integrally formed on the largest sprocket 40 of the sprocket dome 54, said webs protruding away from the largest sprocket in the direction of the smaller sprockets 42, 44 and 46 of the sprocket dome 54 and serving for the connection to the largest sprocket 38. However, said webs are not integrally connected to the largest sprocket 38.

An alternative connection of the sprocket 40 to the largest sprocket 38 is illustrated by way of example in the upper half of the image of FIG. 2. A pin 64 which passes through the sprocket 38 can thus be integrally formed as a single piece on the sprocket 40, on the side facing the largest sprocket 38. Instead of a pin which is integrally formed on the sprocket 40, the pin 64 can also be formed separately from the sprockets 38 and 40 which are connected by said pin, or the pin 64 can be formed integrally on the sprocket 38, specifically on the side facing the sprocket 40, and can pass through the sprocket 40.

The integral connection of the sprockets 40 to 46 to one another in order to form the sprocket dome 54 can be entirely or partially replaced by the illustrated or by the above-explained pin connection using the pin 64.

With the above mentioned spacing of the sprockets 38 to 52, the sprocket arrangement 26 has a gear range of forty-eight (48) divided by eleven (11), i.e. approximately 436.4%. The individual percentage gear stage steps from the smallest sprocket 52 to the largest sprocket 38 are thirteen (13) minus eleven (11), divided by eleven (11), i.e. approximately 18.2%; fifteen (15) minus thirteen (13), divided by thirteen (13), i.e. approximately 15.4%; eighteen (18) minus fifteen (15), divided by fifteen (15), i.e. 20%; twenty-four (24) minus eighteen (18), divided by eighteen (18), i.e. approximately 33.3%; thirty-two (32) minus twenty-four (24), divided by twenty-four (24), i.e. approximately 33.3%; forty (40) minus thirty-two (32), divided by thirty-two (32), i.e. 25%; and forty-eight (48) minus forty (40), divided by forty (40), i.e. 20%. All of the gear stage steps therefore lie within a range of between 15.4% and 33.3%. It is therefore possible to divide a large gear range relatively uniformly into similarly relatively few gear stages. At the same time, no gear stage step is of such a size that, during a gear changing operation into a gear stage or out therefrom, the cyclist would perceive an unpleasantly large torque jump.

The arithmetic mean of the individual percentage gear stage steps calculated above, i.e. the average percentage gear stage step, is approximately 23.6% in the example illustrated.

The front chainring 24 advantageously has an effective number of teeth of forty (40) teeth, which, in the case of the pedelec 10 which is illustrated here and is assisted by an electric motor, is customarily achieved by a chainring having sixteen (16) teeth and a gearing connected upstream and having an amplification of the torque by 2.5 times from the location at which the torque is introduced towards the chainring 24.

If, in the case of the bicycle 10 illustrated by way of example, the starting point is an entirely customary pedal frequency of sixty-five (65) revolutions per minute, then, using the particular rear wheel, a size of which is likewise known, together with the chain, a speed of approximately 7.5 kilometers per hour is achieved at the largest sprocket 38, a speed of approximately 9 kilometers per hour is achieved at the second largest sprocket 40, a speed of 11.2 kilometers per hour is achieved at the third largest sprocket 42, a speed of approximately 15 kilometers per hour is achieved at the fourth largest sprocket 44, a speed of approximately 19.9 kilometers per hour is achieved at the fifth largest sprocket 46, a speed of approximately 23.9 kilometers per hour is achieved at the sixth largest sprocket 48, a speed of 27.6 kilometers per hour is achieved at the seventh largest sprocket 50, and a speed of 32.6 kilometers per hour is achieved at the smallest sprocket 52.

Depending on the respective legal regulations, in the case of bicycles assisted by electric motor an output of an assisting torque by the electric motor is permitted only up to a predetermined speed limit. In Germany, for example, the cyclist is allowed to be assisted by the full torque of the assisting electric motor 32 only up to a speed of twenty-five (25) kilometers per hour. At higher speeds, either assistance is no longer permitted or—at speeds slightly above the limit speed of twenty five (25) kilometers per hour—only a partial assistance is permitted by a partial torque which is reduced in comparison to the full assisting torque.

In the case of the present rear wheel sprocket arrangement 26 of the example illustrated, full assistance of the cyclist by the torque of the electric motor 32, with the stated assumptions of a front chainring 24 having an effective number of teeth of forty (40) and a pedal frequency of sixty-five (65) revolutions per minute, is thus found only in gear stages which are formed by the six (6) largest sprockets 38 to 48. In the present case, the sprocket 48 is therefore the sprocket which is assigned to the assisting limit speed of twenty-five (25) kilometers per hour, for which particularly severe wear can be anticipated for the reasons mentioned in the introductory part of the description.

For the advantageous utilization of the greatest possible assistance of the cyclist by the assisting electric motor 32, the largest individual percentage gear stage steps lie within this "assisting range" which is formed by the six (6) largest sprockets 38 to 48. The largest individual percentage gear stage steps of in each case 33.3% advantageously lie between the third largest and the fourth largest sprockets 42 and 44 and between the fourth largest and the fifth largest sprockets 44 and 46. The third largest individual percentage gear stage step of 25% (nominally actually the second largest individual percentage gear stage step) is provided between the second largest and the third largest sprockets 40 and 42. By this means, high acceleration is achieved while simultaneously avoiding undesirable multiple gear changing operations.

The three (3) smallest sprockets 52, 50 and 48 form a first group of sprockets which, when viewing in the axial direction from the smallest sprocket 52 towards the largest sprocket 38, become degressively larger. This means that the individual percentage gear stage steps placed between said sprockets 52 to 48 become smaller in the direction from the smallest sprocket 52 towards the largest sprocket 38.

The three (3) successive axially adjacent sprockets 48, 46 and 44 form a second group of sprockets which, when viewing in the axial direction from the smallest sprocket 52 towards the largest sprocket 38, become progressively larger. This means that the individual percentage gear stage steps placed between the sprockets 48 to 44 become larger in the stated viewing direction.

The three (3) largest successive axially adjacent sprockets 42, 40 and 38 form a third group of sprockets which, when viewing in the axial direction from the smallest sprocket 52 towards the largest sprocket 38, became degressively larger. The individual percentage gear stage steps placed between the sprockets 42 to 38 become smaller in turn in the stated viewing direction.

The sprocket 48 belongs as a boundary sprocket both to the first and to the second group.

For the sprockets 48 to 38, the particularly advantageous condition for precise gear changing of the bicycle chain 30 from one sprocket of the sprockets 48 to 38 to an axially directly adjacent sprocket of the sprockets 48 to 38 applies that the numbers of teeth of each of two (2) axially directly adjacent sprockets can be divided by the difference in the numbers of teeth thereof without a remainder.

The sprocket arrangement 26 is passed through axially by a driver 66. With said driver 66, the sprocket arrangement 26 is connected to the rear wheel axle (not illustrated in FIGS. 2 and 3) of the rear wheel 14 in the driving direction for the transmission of torque and by a freewheel in the direction counter to the driving direction.

The preferably generally planar largest sprocket 38 has, at its border closest to the sprocket axis A, an opening 68 through which the driver 66 likewise passes. There is no direct torque transmission connection between the largest sprocket 38 and the driver 66. Said torque transmission connection is on the contrary only produced by an adapter element 70 which is firstly connected to the largest sprocket 38 in a torque-transmitting manner and is secondly connected to the driver 66 in a torque-transmitting manner.

The adapter element 70 is provided on the rear side 38*b* of the largest sprocket 38, which rear side faces away from the remaining sprockets 40 to 52. This unusual arrangement of the adapter element 70 is firstly possible because of the number of sprockets of a total of only eight (8) sprockets of the sprocket arrangement 26 and is secondly possible because of the relatively small distance between the front faces 38*a*, 40*a*, 42*a*, 44*a*, 46*a*, 48*a*, 50*a*, and 52*a*, which distance, in the present example, is between 4.2 millimeters and 4.4 millimeters, in detail is precisely 4.35 millimeters.

Owing to the number of sprockets of up to nine (9), precisely eight (8) in the example illustrated, with a simultaneously small front face distance, the sprocket arrangement 26 requires so little axial construction space that the adapter element 70 can be arranged outside the construction space taken up axially by the sprocket arrangement 26. By this means, the sprocket arrangement 26, in particular the largest sprocket 38, which is particularly loaded by chain skew, can be arranged axially further away from the longitudinal centre plane of the bicycle 10, and therefore the skew angle of the bicycle chain 30 relative to the longitudinal centre plane of the bicycle 10 is smaller if said bicycle chain runs over the largest sprocket 38 than if the adapter element 70 were arranged on the side of the front face 38a of the largest sprocket 38. As a result, the loading of the largest sprocket 38 which, because of its considerable diameter, exhibits an increased buckling tendency can be considerably reduced during operation.

A spacer sleeve 72 which defines the axial distance of the largest sprocket 38 from the smallest sprocket 46 of the sprocket dome 54 is advantageously arranged in order to axially support the largest sprocket 38 in the vicinity of the driver 66.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

What is claimed:

1. A rear wheel sprocket arrangement for a bicycle comprising:
   a plurality of sprockets comprising at least seven (7) coaxially arranged sprockets having different numbers of teeth,
   wherein an entire gear range of the sprocket arrangement is at least three-hundred fifty percent (350%), and
   wherein an average percentage gear stage step lies within a range of fifteen percent (15%) to thirty percent (30%).

2. A rear wheel sprocket arrangement according to claim 1, wherein the entire gear range of the sprocket arrangement is at least four-hundred percent (400%).

3. A rear wheel sprocket arrangement according to claim 1, wherein the entire gear range of the sprocket arrangement is at least four-hundred thirty-five percent (435%).

4. A rear wheel sprocket arrangement according to claim 1, wherein the average percentage gear stage step lies within a range of twenty percent (20%) to thirty percent (30%).

5. A rear wheel sprocket arrangement according to claim 1, wherein values of individual percentage gear stage steps lie within a range of fifteen percent (15%) to thirty-five percent (35%).

6. A rear wheel sprocket arrangement according to claim 1, wherein the plurality of sprockets comprises, when viewing in an axial direction from a smallest sprocket towards a largest sprocket, a group of axially successive sprockets which become progressively larger, and a group of axially successive sprockets which become degressively larger.

7. A rear wheel sprocket arrangement according to claim 6, wherein the group of axially successive sprockets which become progressively larger is placed axially between two (2) groups of axially successive sprockets which become degressively larger.

8. A rear wheel sprocket arrangement according to claim 7, wherein a largest individual percentage gear stage step occurs between a third largest sprocket of the plurality of sprockets and a fourth largest sprocket of the plurality of sprockets or between the fourth largest sprocket and a fifth largest sprocket of the plurality of sprockets.

9. A rear wheel sprocket arrangement according to claim 7, wherein a largest individual percentage gear stage step occurs between a third largest sprocket of the plurality of sprockets and a fourth largest sprocket of the plurality of sprockets and between the fourth largest sprocket and a fifth largest sprocket of the plurality of sprockets.

10. A rear wheel sprocket arrangement according to claim 1, wherein a largest sprocket of the plurality of sprockets has at least forty-four (44) teeth.

11. A rear wheel sprocket arrangement according to claim 10, wherein the largest sprocket has at least forty-eight (48) teeth.

12. A rear wheel sprocket arrangement according to claim 10, wherein a smallest sprocket of the plurality of sprockets has at least ten (10) teeth and not more than thirteen (13) teeth.

13. A rear wheel sprocket arrangement according to claim 12, wherein the smallest sprocket has at least eleven (11) teeth and not more than thirteen (13) teeth.

14. A rear wheel sprocket arrangement according to claim 1, wherein the number of teeth of each of four (4) largest sprockets of the plurality of sprockets is an integral multiple of four (4).

15. A rear wheel sprocket arrangement according to claim 14, wherein the number of teeth of each of the four (4) largest sprockets of the plurality of sprockets is an integral multiple of eight (8).

16. A rear wheel sprocket arrangement according to claim 14, wherein the number of teeth of each of three (3) sprockets from a group of four (4) axially successive sprockets, comprising the sprockets from a fourth largest sprocket to a seventh largest sprocket, is an integral multiple of three (3).

17. A rear wheel sprocket arrangement according to claim 1, wherein a largest sprocket of the plurality of sprockets is generally planar.

18. A rear wheel sprocket arrangement according to claim 1, wherein a largest sprocket of the plurality of sprockets has a central opening through which a driver passes, wherein there is no direct form-fitting engagement between the largest sprocket and the driver for transmitting torque from the largest sprocket to the driver.

19. A rear wheel sprocket arrangement according to claim 18, wherein the largest sprocket is coupled to the driver by an adapter element for the transmission of torque, wherein the adapter element is placed on a side of the largest sprocket which faces away from the rest of the plurality of sprockets.

20. A rear wheel sprocket arrangement according to claim 1, wherein at least three (3) sprockets are designed as a single-piece sprocket component within the rear wheel sprocket arrangement.

21. A rear wheel sprocket arrangement according to claim 20, wherein at least four (4) sprockets of the plurality of sprockets are designed as the single-piece sprocket component within the rear wheel sprocket arrangement.

22. A rear wheel sprocket arrangement according to claim 20, wherein largest and smallest sprockets of the plurality of sprockets are each formed separately as individual sprockets.

23. A rear wheel sprocket arrangement according to claim 20, wherein the single-piece sprocket component comprises a second largest sprocket.

24. A rear wheel sprocket arrangement according to claim 1, wherein the plurality of sprockets comprises only seven (7) sprockets.

25. A rear wheel sprocket arrangement according to claim 1, wherein the plurality of sprockets comprises only eight (8) sprockets.

26. A rear wheel sprocket arrangement according to claim 1, wherein the plurality of sprockets comprises only nine (9) sprockets.

27. A rear wheel sprocket arrangement according to claim 1, wherein a front face distance between axially directly adjacent sprockets is between 4.2 millimeters and 4.4 millimeters.

28. A rear wheel sprocket arrangement according to claim 27, wherein the front face distance between axially directly adjacent sprockets is between 4.3 millimeters and 4.4 millimeters.

29. A drive assembly for a bicycle, comprising a rear wheel sprocket arrangement according to claim 1, and a front chainring, wherein the number of teeth of the front chainring is smaller than the number of teeth of a largest sprocket of the plurality of sprockets and larger than the number of teeth of a third largest sprocket of the plurality of sprockets.

30. A drive assembly for a bicycle according to claim 29, wherein the front chainring and a second largest sprocket of the plurality of sprockets have the same number of teeth.

31. A drive assembly for a bicycle according to claim 29, further comprising an assisting electric motor configured to transmit assisting torque to the rear wheel via the rear wheel sprocket arrangement, wherein the assisting electric motor is coupled to the chainring in order to transmit torque.

* * * * *